United States Patent
Drayer

(12) 
(10) Patent No.: US 6,705,621 B1
(45) Date of Patent: Mar. 16, 2004

(54) WATER CADDY

(76) Inventor: Stephen M. Drayer, 3921 Ranch Dr., Bay City, MI (US) 48706

( * ) Notice: Subject to any disclaimer, the term of this patent is extended or adjusted under 35 U.S.C. 154(b) by 0 days.

(21) Appl. No.: 10/043,490

(22) Filed: Jan. 10, 2002

(51) Int. Cl.[7] .................................................. B62B 1/14
(52) U.S. Cl. ..................................... 280/30; 280/47.27
(58) Field of Search ............................. 280/30, 47.131, 280/47.17, 47.2, 47.23, 47.24, 47.27, 47.26, 47.32, 79.11, 79.2, 79.3, 79.5

(56) References Cited

U.S. PATENT DOCUMENTS

| | | | |
|---|---|---|---|
| 423,188 A | | 3/1890 | Stansbury et al. |
| 724,991 A | | 4/1903 | Caton |
| 1,375,593 A | | 4/1921 | Kaufman |
| 1,636,682 A | | 7/1927 | Carlson |
| 2,229,244 A | * | 1/1941 | Husted ..................... 280/79.11 |
| 2,293,460 A | | 8/1942 | Friend |
| 2,364,246 A | | 12/1944 | Shaver et al. |
| 3,647,236 A | * | 3/1972 | Hayes ........................ 280/47.2 |
| 3,893,687 A | | 7/1975 | Victor |
| 3,954,155 A | * | 5/1976 | Guidara ........................ 280/30 |
| 4,362,307 A | * | 12/1982 | Nakatani ..................... 280/30 |
| 4,865,339 A | | 9/1989 | Rundborg et al. |
| 4,886,233 A | | 12/1989 | Bateman et al. |
| 5,029,602 A | * | 7/1991 | McKinney et al. ......... 280/47.2 |
| 5,288,200 A | | 2/1994 | Burgers et al. |
| 5,406,996 A | | 4/1995 | Wagner et al. |
| 5,582,503 A | | 12/1996 | Sandoval |
| 5,732,857 A | | 3/1998 | Yared |
| 6,042,130 A | * | 3/2000 | Souza ........................ 280/79.5 |
| 6,047,866 A | * | 4/2000 | Brown ..................... 280/47.26 |
| 6,082,757 A | * | 7/2000 | Lin ........................... 280/47.26 |

* cited by examiner

*Primary Examiner*—Frank Vanaman
(74) *Attorney, Agent, or Firm*—Reising, Ethington, Barnes, Kisselle & Learman, P.C.

(57) ABSTRACT

The water caddy includes a frame with a bottom end supported by a wheel and axle assembly. A handle is attached to the top end of the frame. A container is attached to the frame by a container retention assembly in a position which places most of the weight of the container and container contents on the wheels for transport. The top end of the frame is placed on the ground and the bottom end of the frame is lifted up to raise the water container to an elevated discharge position. A stabilizer leg, that is pivotally attached to the bottom end of the frame, has a ground engaging pad on its second end that sits on the ground and holds the bottom end of the frame in an elevated position.

10 Claims, 2 Drawing Sheets

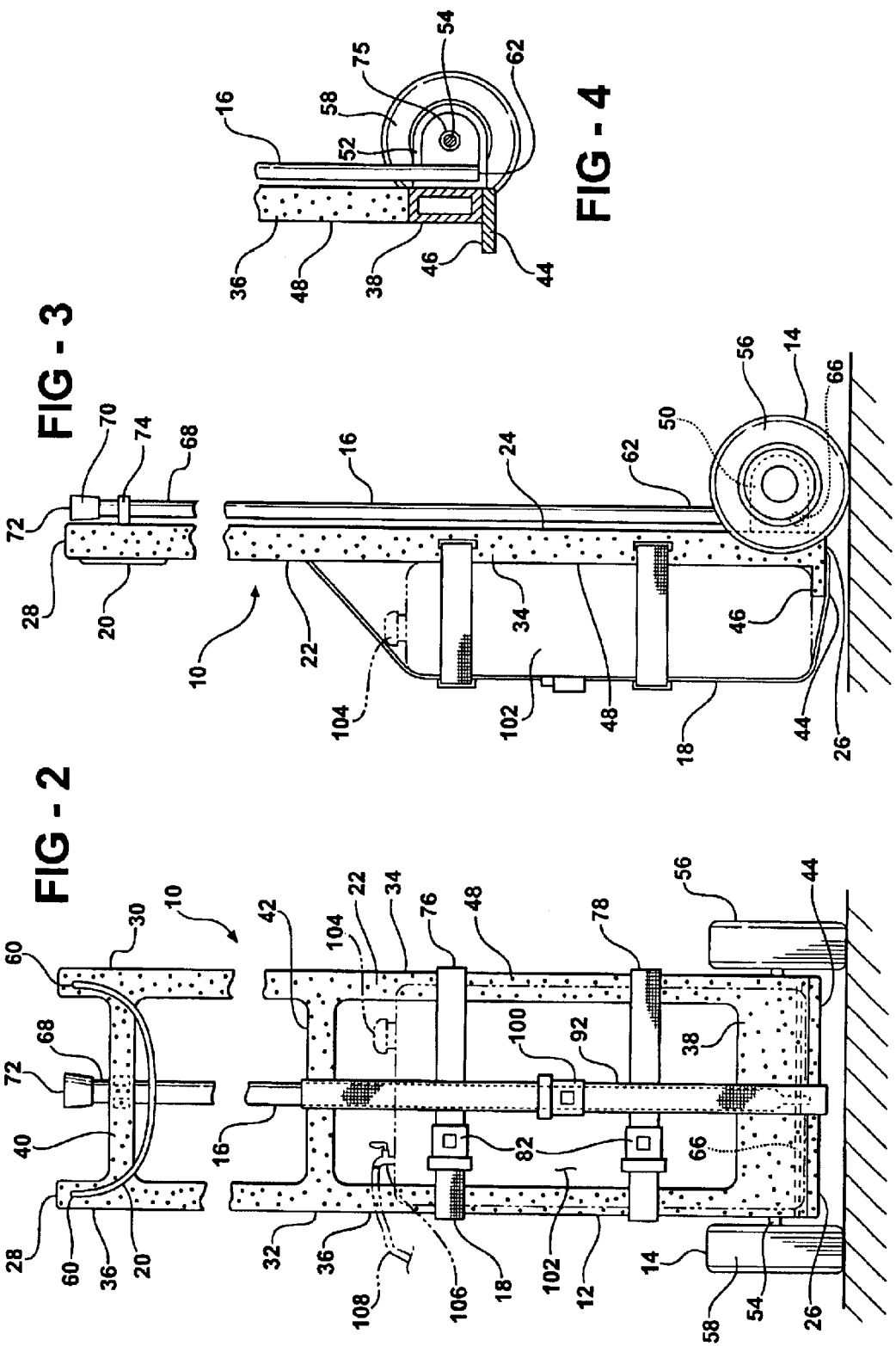

WATER CADDY

TECHNICAL FIELD

The water caddy has a frame supported by two wheels that is manually moved to carry an attached container close to the ground and that is held in an upside down position by a stabilizer leg during discharge of water from the container.

BACKGROUND OF THE INVENTION

Motor homes, travel trailers, and other vehicle mounted living enclosures used by campers are often equipped with a water storage tank. Electric pumps or hand pumps are provided for dispensing water from the tanks. When camping in camp grounds with water supplied to camp sites by hydrants, the water storage tank is not generally used. When camping in camp grounds without hydrants, the water storage tanks are needed.

Camp grounds in North America without hydrants at each camp site generally have one or more portable water supply sources. If the vehicle with a water storage tank can be moved to the water supply point, the storage tank can be filled and the vehicle can be returned to the camp site. However it is generally not desirable to move a vehicle with a water storage tank from a camp site just to fill the storage tank. Normally camping vehicles with sleeping accommodations are jacked up to level the floor and the beds and to eliminate movement of the vehicle permitted by vehicle suspension springs. Once a trailer or other vehicle is jacked up and leveled it is generally not moved again until it is decided to vacate the camp site and move to another location.

Water can be manually carried in containers from the water supply point to a camp site and poured into the water storage tank. This procedure has at least two problems. The water supply point may be hundreds of yards from the camp site. Many individuals who enjoy camping are not physically capable of carrying five gallons of water one hundred yards. Once a container of water is carried to a camp site, the water must be transferred to the water storage tank. The inlet cap for water storage tanks is generally small, raised some distance above the ground and may have a vertical inlet opening. It is hard to pour water from a container into such a storage tank. The portable water container must also be held up fairly high for some period of time while water is transferred from the portable container to the storage tank.

Many systems have been developed for transporting liquids in containers and transferring liquid from the containers following arrival at a dispensing location. Some of these systems require substantial physical strength and stamina. Systems that raise containers to dispense liquids are generally relatively complicated and therefore somewhat expensive.

SUMMARY OF THE INVENTION

The water caddy has a frame with a left side rail, a right side rail and a plurality of cross members attached to the left side rail and to the right side rail. The frame has a front side, a rear side, a top end, a bottom end, and a container support surface on the front side. A container support plate is attached to the frame adjacent to the bottom end and extends forward from the container support surface. A left side axle support is attached to the left side rail adjacent to the bottom end of the frame. A right side axle support is attached to the right side rail adjacent to the bottom end of the frame. A transverse horizontal axle is attached to the left side axle support and to the right side axle support. A left side wheel is journaled on the transverse horizontal axle outboard of the left side rail. A right side wheel is journaled on the transverse horizontal axle outboard of the right side rail. A stabilizer leg has a first end pivotally attached to the frame adjacent to the bottom end and a second end with a ground engaging pad. A stabilizer leg clip is attached to the frame. The clip holds the stabilizer leg adjacent to the rear side of the frame with the ground engaging pad adjacent to the top end of the frame for storage. The stabilizer leg clip releases the stabilizer leg for pivotal movement away from the rear side of the frame and for ground engagement by the ground engaging pad when the top end of the frame is resting on the ground and the bottom end of the frame is in an elevated position. At least one lateral retainer limits lateral movement between the container support surface and containers. At least one vertical retainer limits vertical movement between the container support surface and containers.

BRIEF DESCRIPTION OF THE DRAWINGS

The presently preferred embodiment of the invention is disclosed in the following description and in the accompanying drawings, wherein:

FIG. 2 is a reduced front plan view of the water caddy in a vertical position, and with parts broken away;

FIG. 3 is a side elevational view of the water caddy with parts broken away; and FIG. 4 is a vertical sectional view showing an alternate pivotal connection between the stabilizer leg and the axle.

DESCRIPTION OF THE PREFERRED EMBODIMENTS

Figure 1:
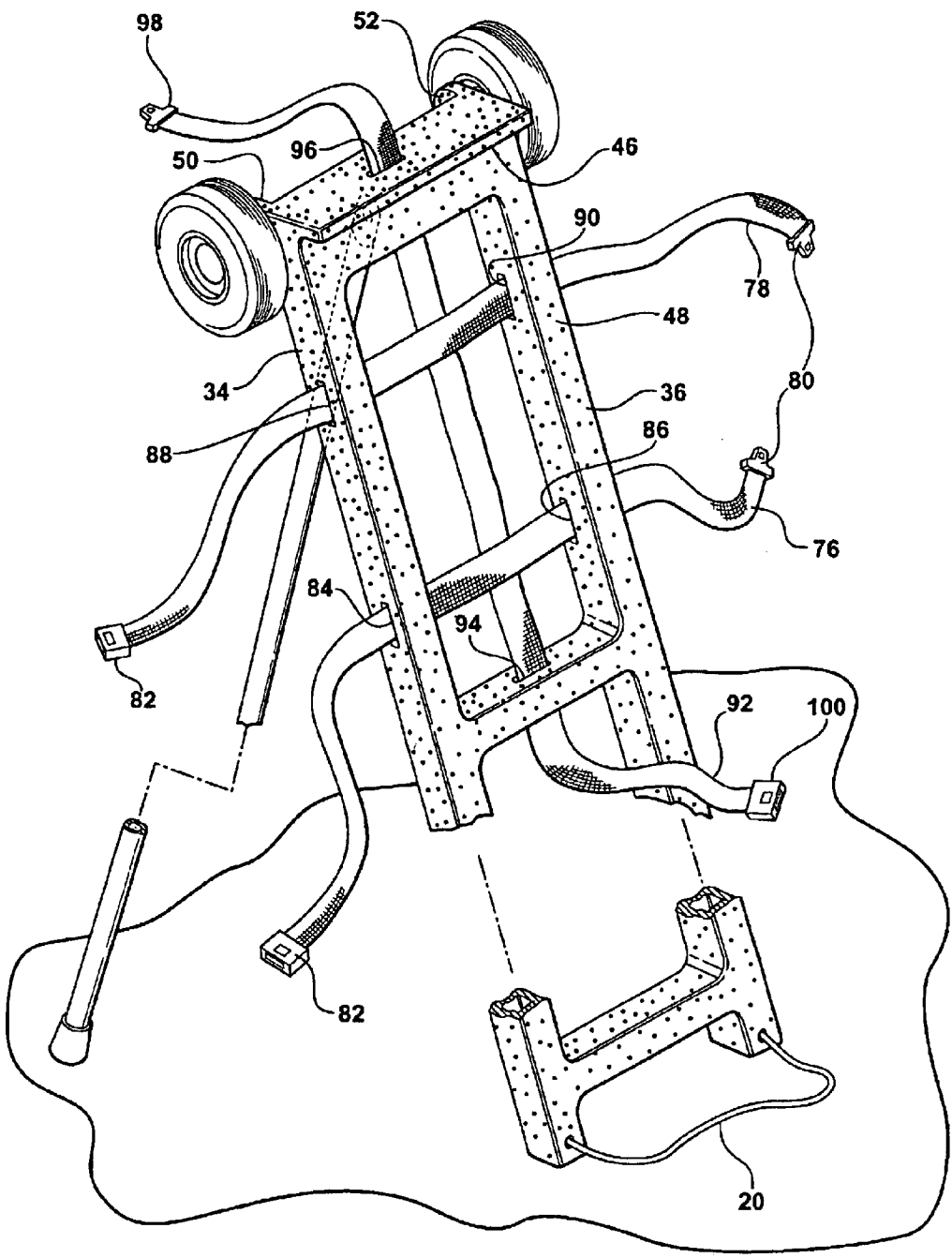
FIG. 1 is a perspective view of the water caddy supported in an inverted position with parts broken away.

The water caddy 10 has a frame 12, a support wheel assembly 14, a stabilizer leg 16, a container retention assembly 18, and a handle 20. The frame 12 has a front side 22, a rear side 24, a bottom end 26, a top end 28, a left side 30, and a right side 32.

The frame 12 is preferably made from a composite material but could also be made from a metal such as aluminum. With either material the frame 12 includes a left side rail 34 and a right side rail 36. A bottom cross member 38, a top cross member 40 and a center cross member 42 are shown in the drawing. These cross members are connected to the left side rail 34 and the right side rail 36 and hold both side rails spaced apart and parallel to each other. The bottom cross member 38 is larger than the other two cross members 40 and 42. The center cross member 42 is half between the top end 28 and the bottom end 26 of the frame 12. The top cross member 40 is spaced a short distance toward the center cross member 42 from the top end 28. Additional cross members can be added if desired.

The top cross member 40 and the center cross member 42 are both tubular and have a square cross section. The left and right side rails 34 and 36 are also tubular and have a square cross section with the same outside dimensions as the top and center cross members 40 and 42. The bottom cross member 38 is a rectangular tube and has the same outside thickness as the side rails 34 and 36.

A container support plate 44 of the frame 12 is attached to the bottom ends of the side rails 34 and 36, the bottom edge of the bottom cross member 38, and extends forwardly from the bottom cross member 38 a short distance to expose a transverse container support surface 46. The left and right side rails 34 and 36, the bottom cross member 38 and the center cross member 42 have container support surfaces 48 that are coplanar and that are normal to the transverse container support surface 46.

A left side axle support block 50 that is attached to the lower end of the left side rail 34. A right side axle support block 52 is attached to the lower end of the right side rail 36. The left and right axle support blocks 50 and 52 both extend rearward from the rear side 24 of the left and right side rails 34 and 36 respectively. Both axle support blocks can be an integral part of the frame 12 or they can be separate parts attached to the frame by bolts.

An axle 54 of the wheel assembly 14 passes through the left side axle support block 50 and the right side axle support block 52. A left wheel 56 and a right wheel 58 are journaled on the ends of the axle 54. Both wheels 56 and 58 are outboard from the adjacent left side rail 34 and the right side rail 36 a short distance as shown in FIG. 2. The wheels 56 and 58 are preferably journaled on the axle 54 by ball bearings (not shown). Bushings could be used in place of the ball bearings. The axle 54 can rotate or it can be fixed relative to the frame 12.

The handle 20 as shown in the drawing is a flexible rope that passes through bores 60 through the left and right side rails 34 and 36. The rope 20 can be made from fibers such as nylon or it can be made from steel.

The stabilizer leg 16 is a pole that is approximately the same length as the left and right side rails 34 and 36. Stabilizer leg 16 has a first end 62 pivotally attached to the frame 12 near the bottom end 26 by a pivot pin 66 for pivotal movement about a transverse horizontal axis as shown in FIGS. 2 and 3. The second end 68 of the stabilizer leg 16 is covered by a cap 70 with a ground engaging pad 72. A stabilizer leg clip 74 is attached to the top cross member 40. The clip 74 has two spring legs that receive the stabilizer leg 16 between them and hold the stabilizer leg in a storage position generally parallel to the left and right side rails 34 and 36. The stabilizer leg 16 is manually pulled from the clip 74 and the cap is pivoted away from the top cross member 40 to a position shown in FIG. 1. The ground engaging pad 72 on the stabilizer leg 16 forms one of the three ground engaging members that support the water caddy 10 in the inverted position shown in FIG. 1. The top ends 28 of the left and right side rails 34 and 36 form the other two legs of a tripod when they are in engagement with the ground. By providing the stabilizer leg with a length that is about the same as the length of the left and right side rails 34 and 36, a substantial portion of the weight of any cargo carried by the water caddy is supported by the left and right side rails. Weight supported by the stabilizer leg 16 is minimized.

FIG. 4 shows a stabilizer leg 16 with a first end 62 that is pivotally attached to the axle 54 by a sleeve 75 journaled on the axle. With this arrangement, the pivot pin 66 is eliminated.

The container retention assembly 18 includes two lateral retaining straps 76 and 78 with male end connectors 80 and female end connectors 82. These straps 76 and 78 are preferably flat nylon straps. The strap 76 passes through slots 84 and 86 through the left and right side rails 34 and 36. The strap 78 passes through slots 88 and 90 through the left and right side rails 34 and 36. A vertical retainer strap 92 passes through a slot 94 through the center cross member 42 and through a slot 96 through the container support plate 44 and the bottom cross member 38. A male fastener 98 and a female fastener 100 are provided on the ends of the vertical strap 92. The number of lateral retainer straps 75 and 78 as well as the number of vertical straps 92 can be changed as desired.

A water container 102 is held against the transverse container support surface 46 and the container support surface 48 by the straps 76, 78 and 92 of the container retention assembly 18. Strap length adjusters (not shown) are provided to accommodate containers 102 with different dimensions as well as to accommodate strap stretch and strap contraction. By securing the container 102 to the lower half of the frame 12, most of the weight is carried by the wheels 56 and 58. The weight to be carried by the handle 20 is minimized making it easier to transport five gallons or more of water over grass and other unpaved surfaces.

The water container 102 includes a cap 104 that is removed for filling. A discharge valve 106 is also provided. A hose 108 of adequate length is secured to the discharge valve 106.

During use of the water caddy 10, the handle 20 is employed to pull the unit to a water point. The cap 104 is removed, the container 102 is filled and the cap is replaced. The water caddy 10 is then pulled using the handle 20. The wheels 56 and 58 support most of the weight of the water as the caddy is pulled to a camp site. The top ends 28 of the left side rail 34 and the right side rail 36 are placed on the ground near a storage tank that is to receive the water. The wheels 56 and 58 are manually lifted upward until the frame 12 is upside down. The stabilizer leg 16 is released from the stabilizer leg clip 74 and pivoted away from the top cross member 40. The ground engaging pad 72 is lowered to the ground as shown in FIG. 1. The hose 108 is inserted into the storage tank inlet and the valve 106 is opened. In the event that the wheels 56 and 58 and the full water container 102 are too heavy to lift manually, the container 102 is partially filled to reduce the total weight.

The disclosed embodiment is representative of a presently preferred form of the invention, but is intended to be illustrative rather than definitive thereof. The invention is defined in the claims.

I claim:

1. A water caddy comprising:

a frame with a left side rail, a right side rail, a plurality of cross members attached to the left side rail and the right side rail, a front side, a rear side, a top end, a bottom end, and a container support surface on the front side;

a container support plate attached to the frame adjacent to the bottom end and extending forwardly from the container support surface;

a left side axle support attached to the left side rail adjacent to the bottom end of the frame;

a right side axle support attached to the right side rail adjacent to the bottom end of the frame;

a transverse horizontal axle attached to the left side axle support and to the right side axle support;

a left side wheel journaled on the transverse horizontal axle outboard of the left side rail;

a right side wheel outboard of the right side rail and journaled on the transverse horizontal axle;

a stabilizer leg having a first end pivotally attached to the frame adjacent to the bottom end and a second end with a ground engaging pad;

a stabilizer leg clip, attached to the frame, holds the stabilizer leg adjacent to the rear side of the frame with the ground engaging pad adjacent to the top end of the frame for storage and that releases the stabilizer leg for pivotal movement away from the rear side of the frame and into ground engagement by the ground engaging pad when with the top end of the frame resting on the ground, the bottom end of the frame, the left side wheel and the right side wheel in an elevated position, and wherein the top end of the frame and the ground engaging pad are the sole ground engaging members; and at least one lateral retainer for limiting lateral movement between the container support surface and containers, and at lest one vertical retainer for limiting vertical movement between the container support surface and containers.

2. A water caddy, as set forth in claim 1, wherein the frame is made from a composite material.

3. A water caddy, as set forth in claim 1, wherein the at least one lateral retainer is a flat strap, and the at least one vertical retainer is a flat strap.

4. A water caddy, as set forth in claim 3, wherein the at least one lateral retainer passes through a left slot through the left side rail and a right slot through the right side rail.

5. A water caddy, as set forth in claim 3, wherein the at least one vertical retainer passes through a lower slot through one of the plurality of cross members and through an upper slot through another one of the plurality of cross members.

6. A water caddy, as set forth in claim 3, including a water container secured to the frame by the at least one lateral retainer strap and by the at lest one vertical retainer strap.

7. A water caddy, as set forth in claim 1, including a handle connected to the left side rail and the right side rail.

8. A water caddy, as set forth in claim 7, wherein the handle is a flexible rope with a left end attached to the left side rail and a right end attached to the right side rail.

9. A water caddy, as set forth in claim 1, wherein the first end of the stabilizer leg is pivotally attached to the frame by a pivot pin that is parallel to the transverse horizontal axle.

10. A water caddy, as set forth in claim 1, wherein the first end of the stabilizer leg is journaled on the transverse horizontal axle.

* * * * *